Oct. 29, 1963  B. F. GREENE, JR., ETAL  3,109,170
AIRCRAFT TRAFFIC CONTROL
Filed Oct. 8, 1957  17 Sheets-Sheet 4

BENJAMIN F. GREENE JR., MARTIN L. ERNST,
HERBERT M. KNIGHT, INVENTORS
FREDERICK F. SLACK, JAMES B. CAWLEY
EDWARD D. OSTROFF & RICHARD O. McMANUS
BY
Wade Koontz and
Martin J. Finnegan
ATTORNEYS Oct. 29, 1963   B. F. GREENE, JR., ETAL   3,109,170
AIRCRAFT TRAFFIC CONTROL
Filed Oct. 8, 1957   17 Sheets-Sheet 14

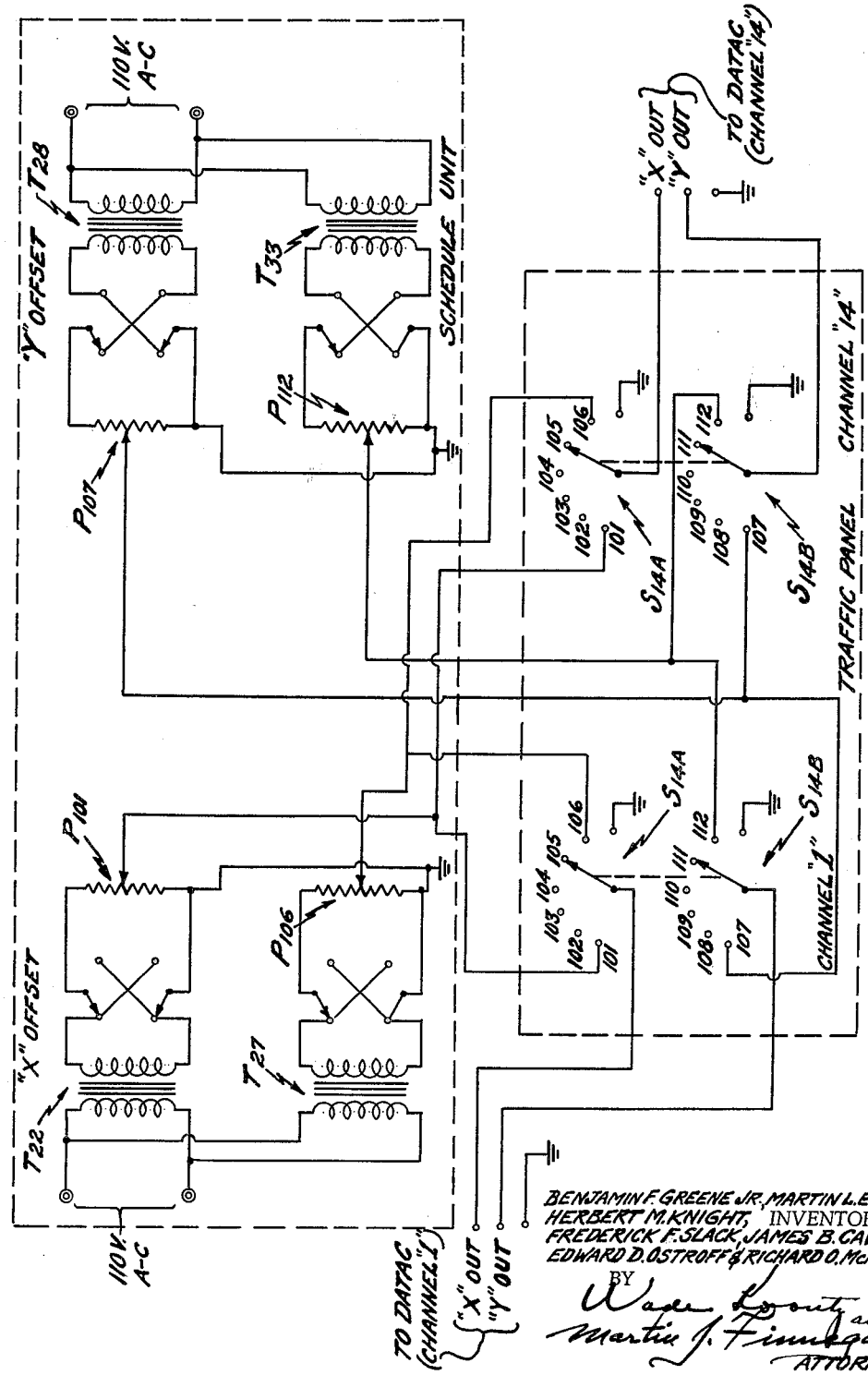

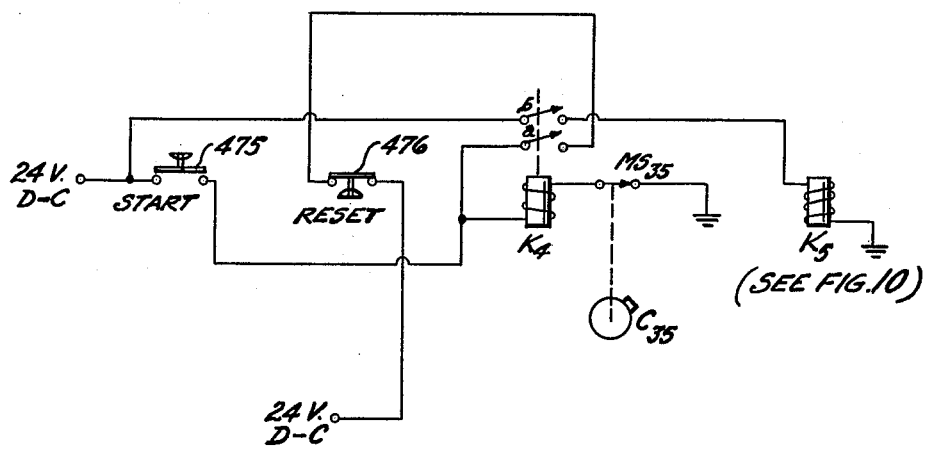

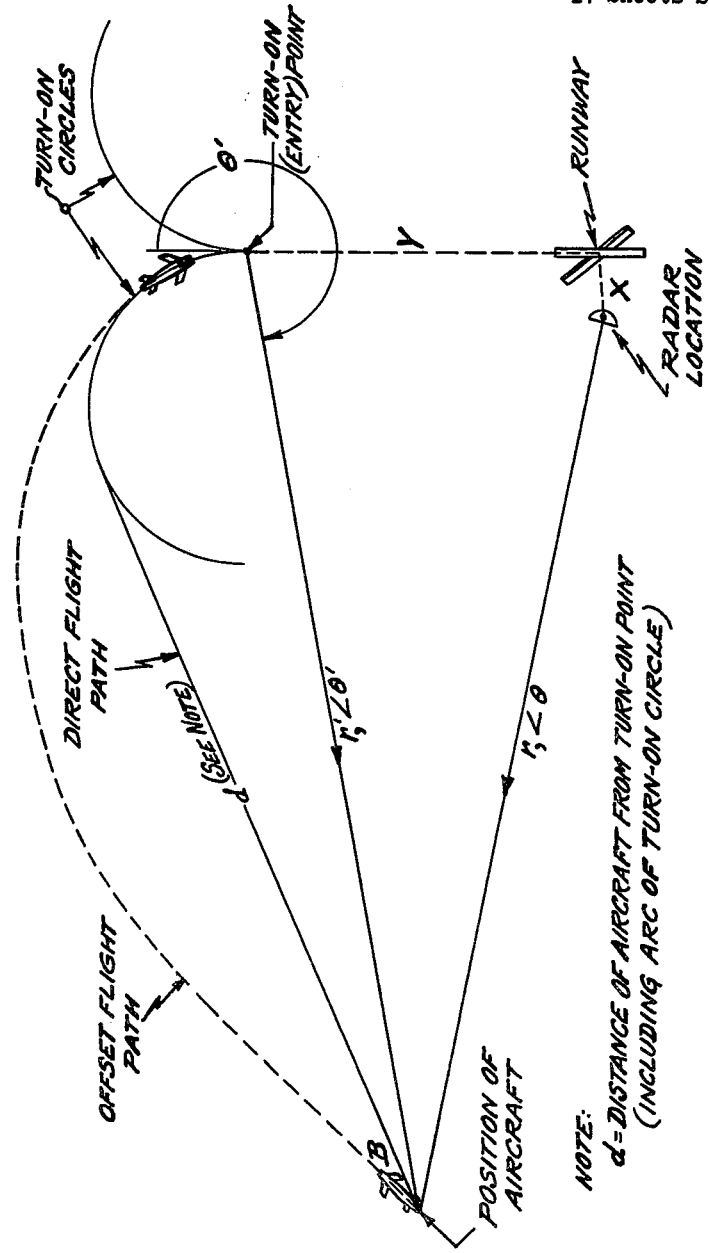

United States Patent Office 3,109,170
Patented Oct. 29, 1963

3,109,170
AIRCRAFT TRAFFIC CONTROL
Benjamin F. Greene, Jr., Canton, and Herbert M. Knight, Arlington, Mass., Martin L. Ernst, Alexandria, Va., and Frederick F. Slack, Stoneham, Edward D. Ostroff, South Sudbury, James B. Cawley, North Reading, and Richard O. McManus, Woburn, Mass., assignors to the United States of America as represented by the Secretary of the Air Force
Filed Oct. 8, 1957, Ser. No. 689,014
7 Claims. (Cl. 343—7.3)
(Granted under Title 35, U.S. Code (1952), sec. 266)

The invention described herein may be manufactured and used by or for the United States Government for governmental purposes without payment to us of any royalty thereon.

The described invention relates to aircraft traffic control, and particularly to methods and means for observing, analyzing, and resolving problems arising out of the approximately simultaneous convergence of a plurality of aircraft toward a limited area surrounding a landing field at which all of such craft desire to land.

The invention provides a control method based, in part, upon the principle that—considering the difficulties inherent in prior art "block" systems which place upon the converging pilots the burden of following rigidly an assigned inflexible path—a complex traffic problem can best be resolved by introducing into the control procedure a maximum degree of flexibility.

The present invention also provides a control method that may be practiced by utilization of control apparatus concentrated at the control station adjacent to the landing area, hence not requiring performance of computing or controlling functions by apparatus or personnel in the affected aircraft, as in certain prior art systems.

Utilizing the above-outlined principle of maximum flexibility, the invention provides methods and means, first, for assigning to each approaching craft an arrival time, based upon prior schedule commitments; secondly, for assigning each approaching craft to a designated approach path, with each path being exclusively allocated to a designated craft, and thirdly, for assigning a new approach path to any such craft whenever said craft, for any reason, happens to deviate from the path previously assigned.

As illustrated herein, the described flexible method for assigning such approach paths is executed by manipulation of detecting, analyzing, assimilating, computing, and communicating apparatus incorporating electronic principles and techniques that are combined, interrelated, and applied in the novel fashion dictated by the requirements constituting the basic features of said flexible method of control.

In addition to the above-described principle of control, the invention may be considered as involving three sequential procedures, namely:

(1) The collection of significant data, such as the positions, velocities, and headings of all aircraft within the region embraced by the control pattern;

(2) The analysis and logical assimilation of this data, and the conversion thereof the electrical signals constituting computed solutions to the problems presented by this data; and (3) The transmission of said informational signals, or orders, to the respective aircraft to which they apply.

The data collecting and data assimilating procedures include a signal feed-back operation whose performance is influenced by the physical responses of the aircraft being controlled, so that the aircraft itself is, in effect, a contributing component of the controlling servo loop constituting the signal feed-back means.

The data computing procedure may be carried out through the instrumentality of analog computing apparatus such as is described and illustrated in U.S. patent application No. 380,382 filed September 15, 1953 by Martin L. Ernst, now U.S. Patent No. 2,825,054, one of the co-applicants herein; conversely, it may be embodied in any equivalent digital or analog computer apparatus capable of receiving the data referred to, and transforming such data into electrical signals for transmission to the respective aircraft. The present invention embraces not only certain variations in the computer details and mode of operation, but also the complete concept of air traffic control by the successive utilization of the three sequential procedures above-outlined, irrespective of the specific details of the computer mechanism employed in the second of the three said procedures.

Other characteristics of the invention will be apparent upon reference to the following description of one method of practicing the said invention, which method is applicable through the use of the apparatus illustrated in the accompanying drawings. Said apparatus, which also constitutes an embodiment of the invention, is depicted in a series of views bearing reference characters identified in the following description, said views being as follows:

FIGS. 8, 9, 15 and 17 show complementary parts of the circuitry for performing certain of the computing operations;

FIGS. 10 to 14, 16 and 18 are diagrams of relay circuits which also assist in the control of the computing operations, and in the transmission of associated signals;

FIG. 19 is a chart of the timing scheme for channel selection; and

FIG. 20 is a diagram showing certain physical aspects of the control pattern.

Figure 1:
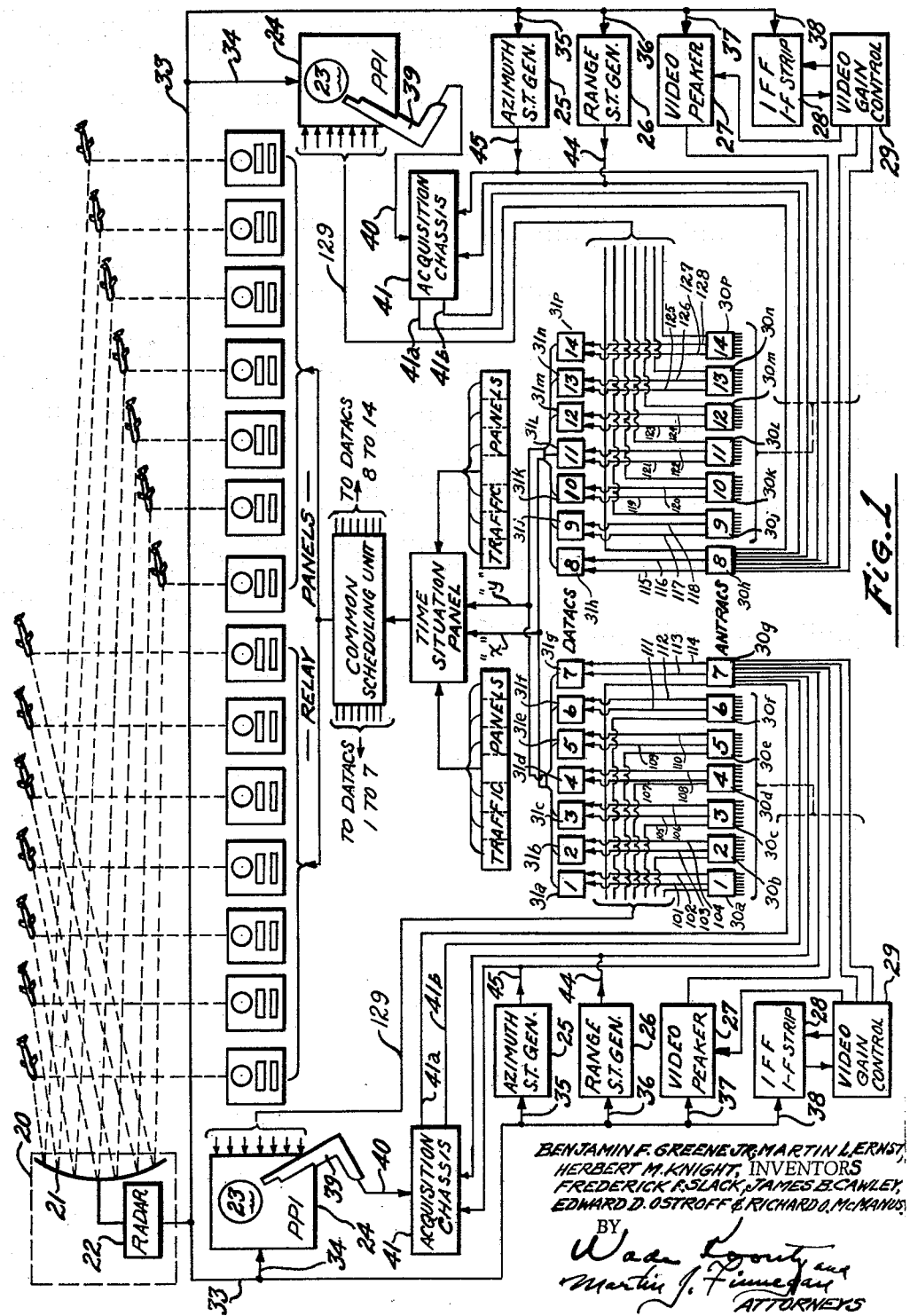
FIG. 1 is a schematic representation of apparatus facilitating practice of, and embodying, the invention.

Referring first to FIG. 1, the invention is therein shown as applied to the task of directing a group of fourteen aircraft in accordance with fourteen separate course-indicating signal patterns in such an electrically transmittable form as to be automatically receivable on known types of data receiving apparatus in the crafts to be controlled, when separately communicated (as, for example, at selected different frequencies) to said aircraft, with the fourteen patterns being dictated by the results of computations performed in the fourteeen computing units schematically designated as "Datac" units 31a to 31p, respectively, in said FIG. 1. The system functions to bring the fourteen illustrated aircraft onto a landing field approach course (not shown in FIG. 1) in timed sequence, with each craft being directed to said approach course over a route differing from that prescribed for other craft; that is, each craft will have its own distinctive route, chosen for it in accordance with the results of the computations in the "Datac" units. Of course, more than fourteen craft, if appearing within the control area and desiring landing instructions, can be directed in similar fashion by adding more "Datac" units and utilizing additional frequency bands for selectively beaming distinctive signals to such additional craft, in the manner to be explained.

Figure 2:
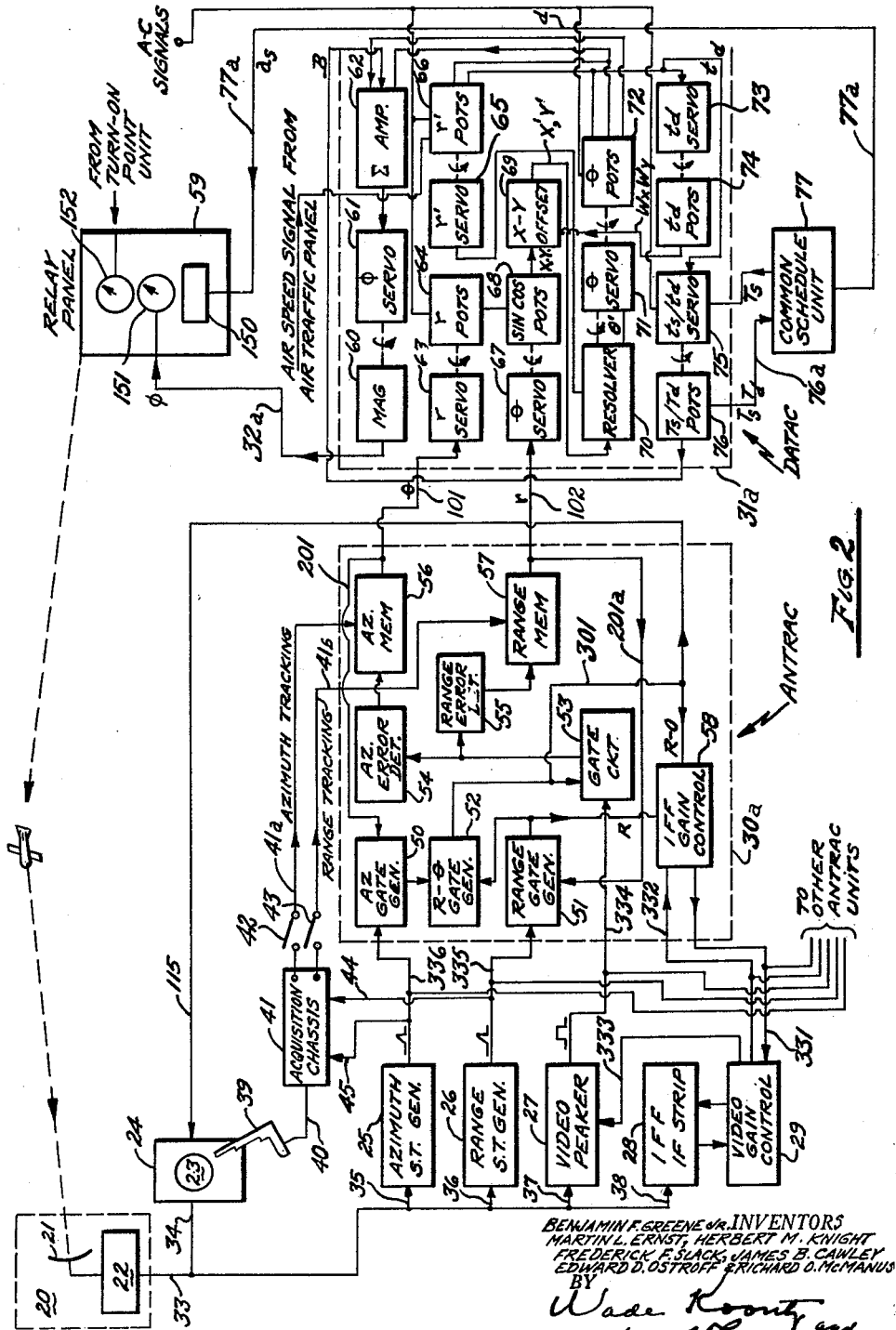
FIG. 2 is a block diagram of circuitry adapted for successive performance of the data collecting, assimilating, and computing steps in the control procedure.

A radar system 20 (FIG. 1) collects data on each of the aircraft in the control area, and applies this data to a series of "Antrac" (automatic tracking) units 30a to 30p, each of which has circuit components such as are indicated by reference numerals 50 to 58, inclusive, for "Antrac" unit 30a in FIG. 2, said units corresponding in number to the number of "Datac" units, with each "Antrac" unit being interconnected with its associated "Datac" unit as indicated by dual (azimuth and range) connections, as indicated at 101 to 128 in FIG. 1. A cable 129 carries conductors for feeding back to the P.P.I Unit 24 the distinctive signal outputs of the successively triggered "Antrac" units, for gating said P.P.I. unit in a manner to permit maintenance of the selected sequence in the delivery of course-computing data signals to units 30 and 31. Such signals may be delivered in the manner now to be described.

Antenna reflector 21 is driven in the normal manner to accomplish volumetric scanning. In synchronism with the drive, azimuth control signals (derived from conventional resolver and volume scanning equipment in radar unit 22) are applied to cathode ray scope 23 of P.P.I. unit 24, by way of leads 33 and 34, to synchronize the angular position of the cathode ray beam with that of antenna 21. Similarly, an azimuth sawtooth sweep trigger signal is derived from the transmitter component of unit 22, and supplied to azimuth sawtooth wave generator 25, by way of leads 33 and 35; and a range sawtooth sweep trigger signal is derived from the transmitter and supplied to range sawtooth wave generator 26 by way of leads 33 and 36. These generators 25 and 26 serve to establish D.-C. reference scales so that the range and azimuth of aircraft can be represented by D.-C. voltages. The range and azimuth sawtooth generators 25 and 26 are so operated as to provide voltages which vary linearly with the radar repetition time and directly with radar antenna scan time. The sawtooth voltage patterns thus established are a primary factor in the overall accuracy of the tracking signals.

The simple range and azimuth sawtooth generators 25 and 26 serve all fourteen of the illustrated tracking channels, to which they are multiplied as indicated by parallel leads 44 and 45 in FIG. 1. A servo gear train and servo amplifier drive each azimuth sawtooth generator, in conventional fashion.

*Video conditioning.*—The incoming radar and IFF video is amplified and peaked before being fed to the tracking channels. A video conditioner unit 27 (FIG. 1), containing five separate video channels, is provided for this purpose.

*Trigger counting.*—In order to track over an arbitrarily chosen range of, say, 60 miles, the frequency of the radar trigger is synchronized with that of the differently cycled IFF signal, to produce a single actuating trigger at a new frequency that is representative of the composite signal content of both inputs to the P.P.I. scope 24. This composite signal is then amplified for use by the range sawtooth generator 26 and the P.P.I. scope 24. Conventional circuitry for this purpose is provided in the range reference unit 26.

As heretofore noted, the polar coordinate tracking unit is illustrated as containing seven tracking channels, 30a to 30g, with each channel capable of tracking one aircraft in range and azimuth. The tracking functions described below are repeated for the seven channels.

Each channel contains electronic "gate" generators 50, 51 and 52 (FIG. 2) which serve to define a small area around the selected aircraft signal. The area is bounded in range and in azimuth; and the size of the area during normal tracking may be, for example, ⅓ mile in range, and one degree in azimuth.

These gates 50, 51 and 52 permit only those video input signals that fall within their boundary to enter the tracking unit error detection and "memory" circuits 53, 54, 56 and 57, respectively.

The gated area is made available by way of conductor 115 (FIG. 2) as a video output at a level which can be displayed on the P.P.I. scope 23.

The aircraft signal within the gate is peaked and is also made available as a video output at a level which can be displayed on the P.P.I. scope. This peaking establishes constant signal strength for all angles of the antenna sweep.

The relative range and azimuth positions of the aircraft and the gate generate an error signal which is detected in units 54 and 55, and used to alter the D.-C. output signals of the tracking channel.

A feed-back loop is employed from the output to control the gate position in a manner to reduce the gate position error to zero. This circuit is sufficiently sensitive to function in response to three radar pulses or "hits" from the aircraft.

The tracking channel serves to "memorize" both range and azimuth position and range and azimuth velocity of the aircraft, so that the D.-C. output signals may vary smoothly and continuously even though the input signals come at discrete intervals determined by the radar scan and repetition periods.

The gate is variable in width and controlled automatically as a function of the continuity of signals received during successive scans of the radar antenna. When two scans contain no video, the gate may be caused to begin to expand, and after four additional scans with no video the gate shall be a size 3 miles and 10 degrees; later, if video is received the gate shall reduce to normal size after four consecutive hits.

The tracking channel contains a unit 58 serving as a gain-controlling means for application of a control signal receiver I.-F. strip 28, by way of unit 29. The gain-control circuit has two functions. First, it provides a range-gated bias for quickly controlling gain to reduce a ring-around or wide-arc IFF signal to a size for range and azimuth gated tracking. This signal is then acquired by the tracking channel, and a range-gated bias is generated proportional to the number of hits within the range-azimuth tracking gate so that an optimum size of IFF signal is maintained for continuous automatic tracking.

Figure 7:
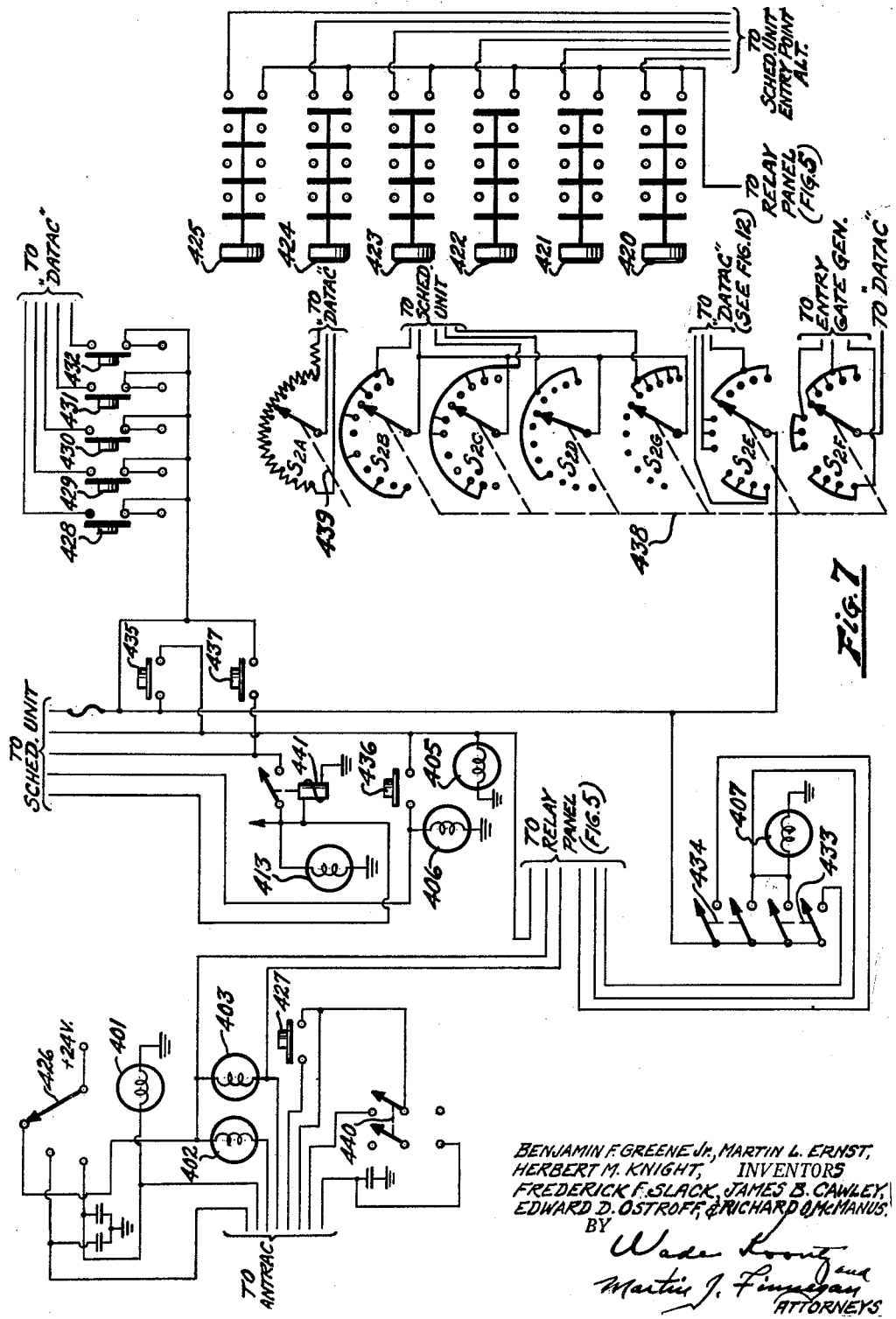
FIG. 7 is a diagram of the circuitry associated with the "traffic" panel illustrated in FIG. 6.

*Signal acquisition.*—This function is accomplished by "light gun" device 39, acquisition chassis 41, and associated controls mounted on the supervisory panel. The light gun (the details of which are described in U.S. patent application No. 475,849 filed December 16, 1954 by Frederick F. Slack, one of the applicants herein) can be pointed manually at an aircraft signal "pip" on scope 23, thereby "apprehending" the pip and automatically converting its illumination into a video pulse which is time-coincident with the appearance of the signal. By means of a three-position manual control switch 426 (FIG. 7), the first available tracking channel may be connected to the light gun 39 and the acquisition chassis 41, and in this way the tracking channel memory is automatically clamped to the proper range and azimuth D.-C. potentials as determined by the position of the "apprehended" signal pip upon which the light gun is pointed. This "apprehending," or "slewing," operation automatically places the tracking gate in the correct range and azimuth position to receive the desired signal. On completion of slewing, further shifting of switch 426 will serve to disconnect the light gun from the tracking unit and connect the tracking unit to the video line from the radar or IFF. When the tracking channel has completed the tracking operation, a third shifting of switch 426 will connect the tracking channel to fixed range and azimuth D.-C. potentials for tracking channel storage. One light gun and one acquisition chassis serve for seven "Antrac" tracking units, i.e., for the seven tracking channels 30a to 30g, inclusive, or for the seven channels 30h to 30p, inclusive.

Figure 3:
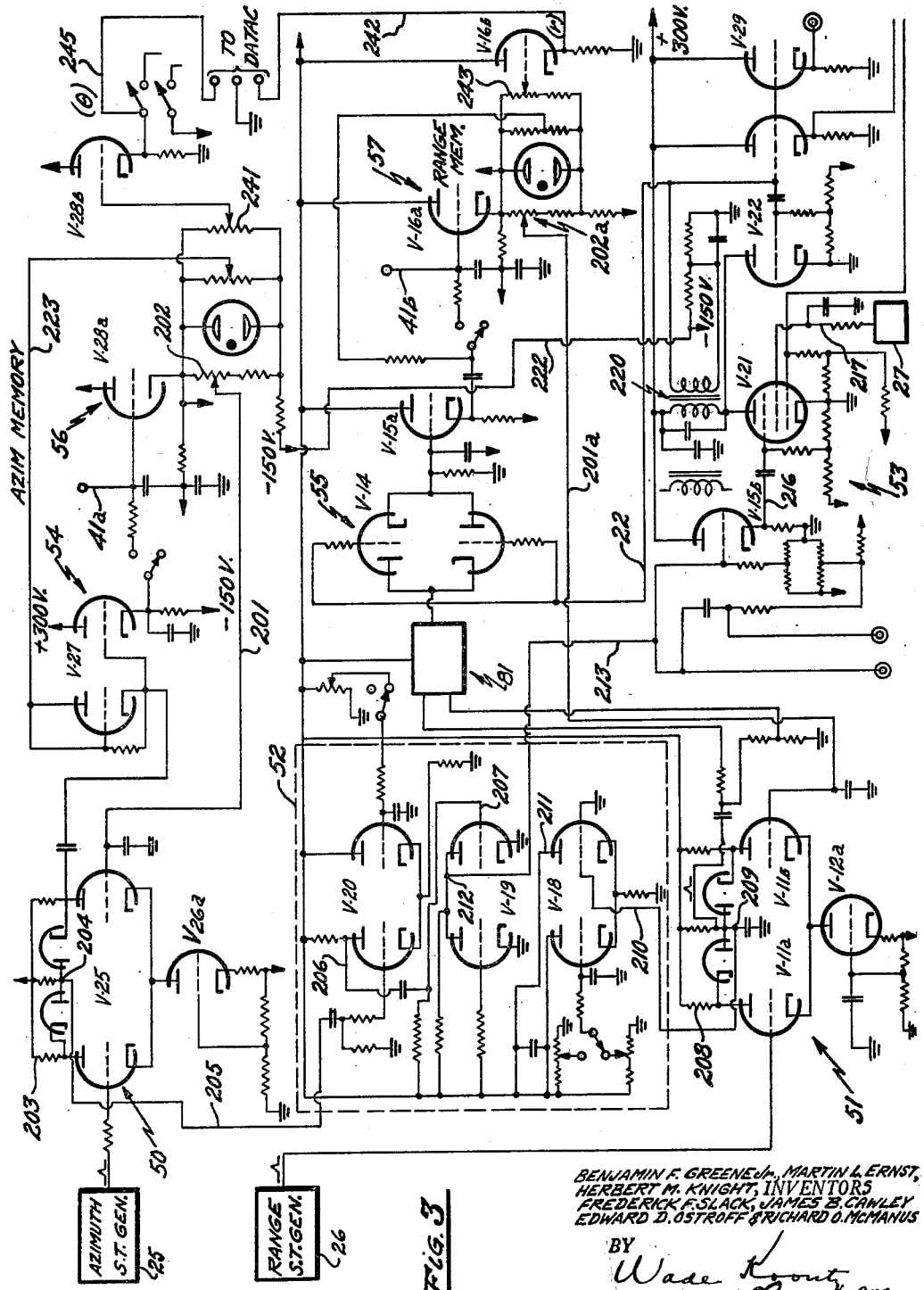
FIGS. 3 and 4 are circuit diagrams of electrical components and connections embodying the functions indicated by certain of the blocks in FIG. 2.

As illustrated in FIG. 3, each azimuth gate generator (such as the one shown at 50 in FIG. 2) includes a twin-triode V–25 whose first grid receives the sawtooth pulses from generator 25, and whose second grid receives feedback signals from memory device 56 by way of feedback line 201 tapped adjustably from resistor 202 of the cathode circuit of triode half V–28a of memory device 56. The gate generator 50 also includes a voltage summation network 203 whose output terminal 204 is connected to the right-hand grid of twin-triode V–19 constituting part of the range-azimuth gate generator 52, the connections being by way of lead 205, left-hand grid of V–20, and plate conductors 201 and 207, as shown in FIG. 3. A similar voltage summation network 208 is associated with range gate generator 51 and its output by way of terminal 209 is eventually reflected at the left-hand grid of twin-triode V–19, by way of conductor 210, right-hand grid of V–18, and plate conductor 211. The r—θ signals are thus combined at plate output junction 212 of tube V–19, and transmitted by way of lead 213 to the grid of tube half V–15b.

Still referring to FIG. 3, the gating of the r—θ signal with the square pulse signal from video peaker 27 (FIG. 1) is accomplished at the dual control grids of coincidence gating tube V–21, which grids are supplied with the respective signal voltages by way of leads 216 and 217, the former being the cathode follower output of tube V–15b, and the latter being the output lead of video peaker 27. The gated output enters the primary windings of transformer 220 whose secondary windings deliver the resultant voltage signal to the grids of twin-triode V–14, by way of lead 221, and to the left-hand grid of twin-triode V–27 by way of leads 222 and 223. These twin triodes V–14 and V–27 serve as error detectors for the range and azimuth signal components, and feed the corrected r and θ signals to the r and θ memory elements 57 and 56, respectively, as designated in FIG. 2, which elements are embodied in tube halves V–16a and V–28a, respectively, according to the circuitry of FIG. 3. These tube halves also receive the r and θ tracking signals from acquisition chassis 41, by way of leads 41a and 41b shown in FIG. 3 as leading to the grids of tube halves V–28a and V–16a, respectively. Thus these tube halves of the particular "Antrac" unit illustrated in FIG. 3 will serve as the "memory" elements for the θ and r signal information that identifies the particular craft to which the FIG. 3 "Antrac" unit has been assigned, in accordance with the P.P.I. scope "pip" signal upon which the light gun 39 is directed.

The cathode-follower outputs of tube halves V–28a and V–16a, respectively, are supplied to a "Datac" computer unit, there being one such unit for each "Antrac" unit, with electrical interconnections therebetween as schematically shown at 242 and 245 in FIG. 2. The cathode follower circuit from V–28a (FIG. 3) passes to the "Datac" unit 31a (FIG. 2) by way of adjustable resistor 241 and the grid of tube half V–28b, thence to the "Datac" unit by way of conductor 102. Similarly, the cathode follower circuit from V–16a passes to the "Datac" unit by way of adjustable resistor 243, tube half V–16b, and lead 101. Feed-back energy returns to θ and r gate generators 50 and 51 by way of feed-back loops 201 and 201a tapped into adjustable resistors 202 and 202a of the cathode follower outputs of the θ and r memory units V–28a and V–16a, respectively. In this fashion the functioning of gate generators 50 and 51 is continuously adjusted to conform to all deviations in θ and r tracking signal content.

Figure 4:
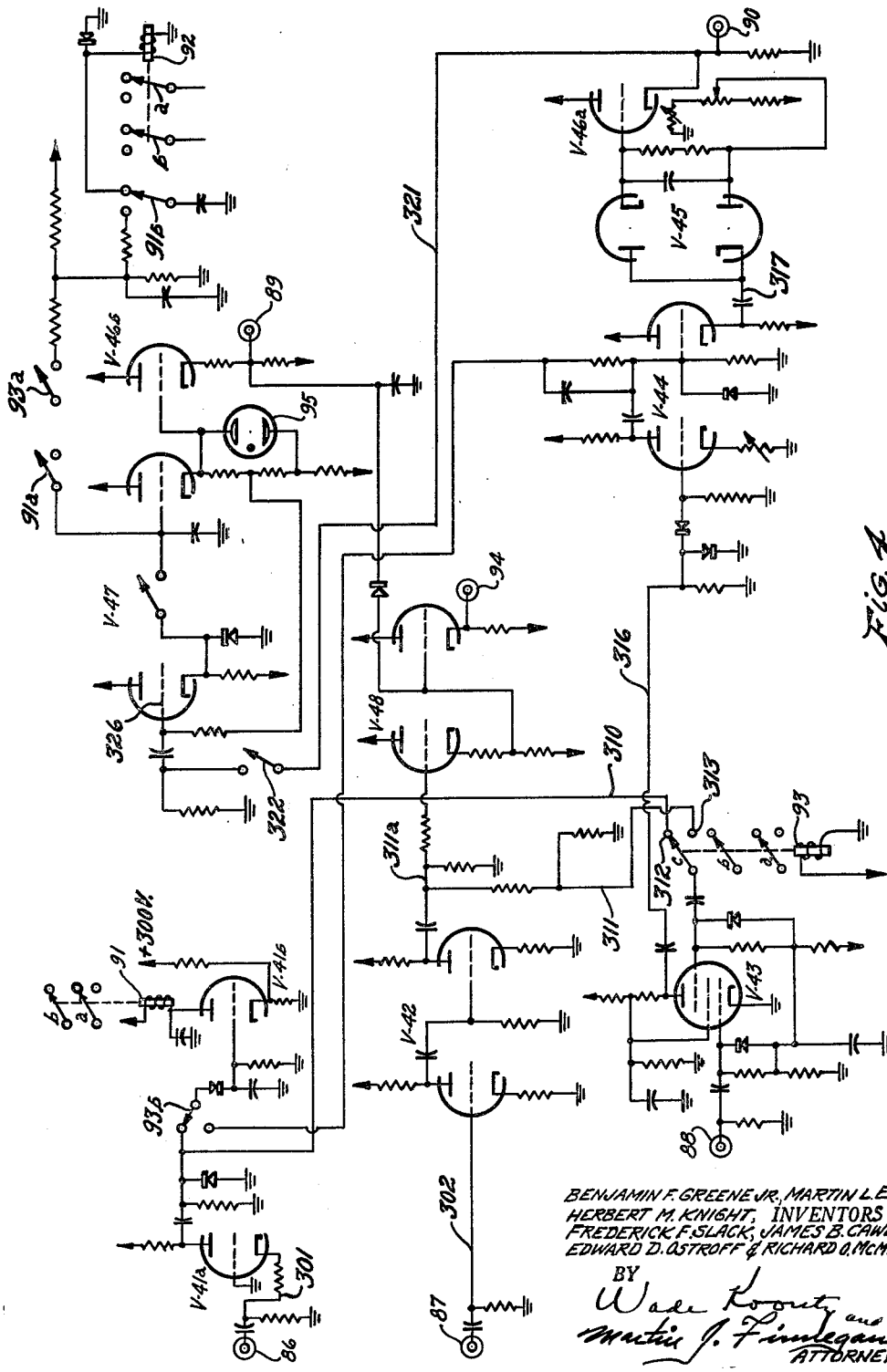

The automatic gain control circuitry, as shown in FIG. 4, includes a dual-grid coincidence control tube V–43 whose lower control grid receives the video gain control signal energy from unit 29 (FIG. 2) by way of input terminal 88, and whose upper control grid receives at alternate periods (as hereinafter explained), the plate outputs of tubes V–41a and V–42, the former having a cathode input circuit 301 carrying the signal output of azimuth gate generator 50 (see FIG. 2) and delivering said input to terminal 86 as shown in FIG. 4. Similarly, terminal 87, FIG. 4 receives the signal output of range gate generator 51 (FIG. 2) and delivers it to the first grid of twin-triode V–42 by way of lead 302.

In order to alternate the delivery of the r and θ gate signals to the upper control grid of tube V–43, there is provided a relay 93 (FIG. 4) whose upper contact arm "c" is normally in the upper position as illustrated in FIG. 4, but shifts to the lower position when the winding of the relay receives an energizing pulse. Such pulses can be caused to recur periodically by suitable conventional means at whatever time interval say, every four seconds, is selected as suitable for performance, each target checking operation. In the upper position the azimuth gate signal is operative (by way of line 310) while in the lower position the range gate signal is delivered, by way of the line 311 leading from the final plate terminal of tube V–42 to the lower contact post 313 of the contact assembly 93c.

When coincidence of potential levels occurs at the dual control grids of tube V–43, there is delivered over the plate output circuit 316 (still referring to FIG. 4) a corrective gain attenuation control voltage that is supplied to the first grid of tube V–44, and this results in delivery of a proportional corrective signal by way of cathode follower circuit 317, discriminator V–45, tube V–46a, and terminal 90. At the same time the basic gain control signal is delivered to video gain control unit 29 (FIG. 2) by way of lead 311a which attaches to the grid terminal of the first half of twin triode tube V–48 whose cathode follower final stage leads to terminal 94, the latter being connected back to the video gain control unit 29 by way of lead 331 (FIG. 2). Also at the same time there is an attenuation signal feedback to tube V–47 (FIG. 4) by way of line 321, switch 322, and grid 326. The cathode follower output of tube V–47 is delivered to the grid of the right-hand half V–46b of tube V–46, whose cathode follower output is reflected at terminal 89, whence it is delivered to a suitable measuring point. Simultaneously, the cathode follower output, representing the gain attenuation control signal, is delivered to the right-hand grid of the main gain control tube V–48, where it combines with the main control signal.

Figure 8:
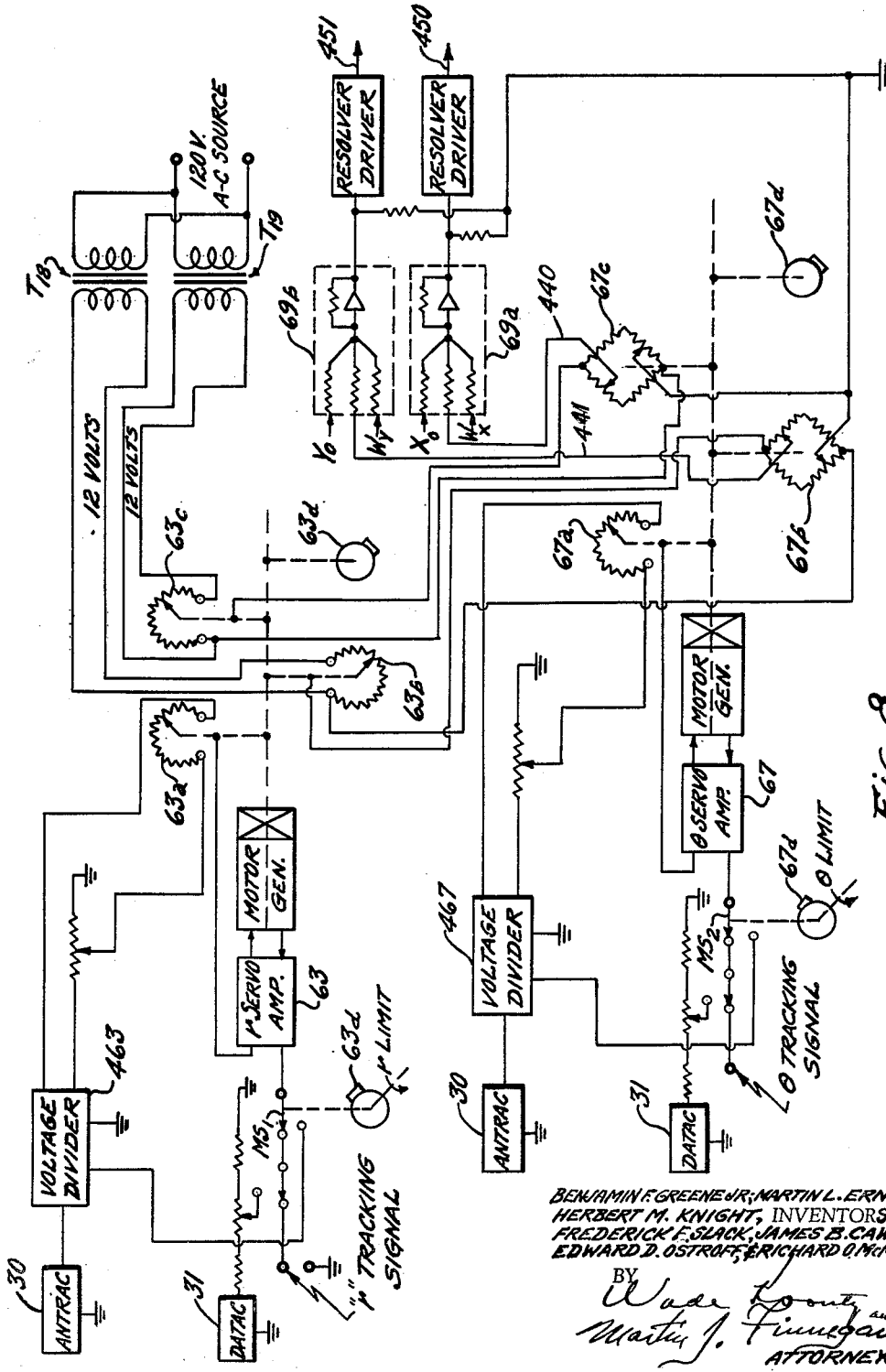

The first operation performed by a "Datac" unit, once it receives D.C. voltages, over lines 242 and 245 (FIG. 2) representative of the radar range (r) and radar azimuth (θ) of an aircraft apprehended on the P.P.I. scope 24 (FIG. 2), is to convert such D.C. voltages into A.C. voltages, representing the "offset" range (r') and the "offset" azimuth (θ') to the "entry point," that is, to the point (see FIG. 20) marking the beginning of the final (straight-line) stage of the runway-approach path "Y" which terminates in the runway, as shown in FIG. 18. This conversion from D.C. to A.C. voltages is accomplished by the action of servo units 63 and 67 (FIGS. 2 and 8) which receive the r and θ voltages, respectively, the "r" unit 63 being connected to operate potentiometer units 63a, 63b and 63c, of which the latter two feed A.C. voltage representative of range to sine-cosine potentiometers 67b and 67c (FIGS. 2 and 8) where it combines with the A.C. voltage representative of azimuth (as determined by the angular motion of θ servo 67) and is then delivered (over lines 440, 441, FIG. 8) as the resultant X', Y' signal, to resolver unit 70 (FIGS. 2 and 9) after first being corrected by superimposing the "X—Y offset" voltage factor as received from unit 69 (FIGS. 2 and 8) for establishing the course to coincide with the "offset flight path" as indicated in FIG. 20, which path differs from the direct flight path "d" by being tangential to a "turn-on" circle of wider radius, hence easier for the apprehended craft to follow. The angle between the two paths (see FIG. 20) is designated as angle beta.

Figure 9:
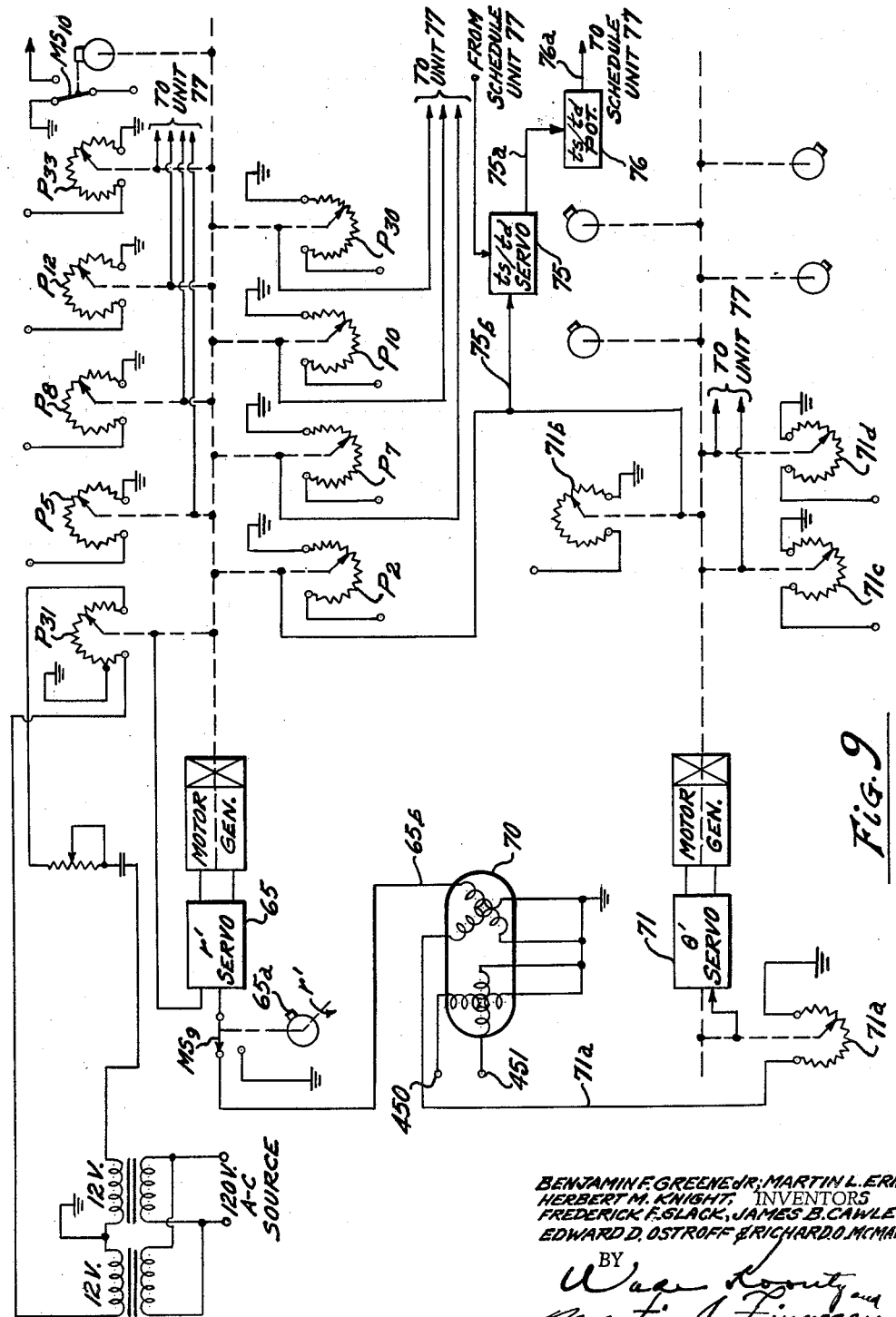

From resolver 70 (FIG. 9) the two component A.C. voltage signals $r'$ and $\theta'$ are delivered to $r'$ and $\theta'$ servos 65 and 71, respectively (FIGS. 2 and 9), by way of leads 65a and 71a, as shown in FIG. 9. These servos control the rotation of $r'$ and $\theta'$ potentiometers 66 and 72, respectively, (FIGS. 2 and 9) whose voltage signals are then combined and delivered, by way of common output lead 75b (FIGS. 2 and 9) the $t_s/t_d$ servo 75 which is a dividing servo mechanism for obtaining the quotient of the "$t_s$" voltage (supplied from schedule unit 77, FIG. 2, by way of lead 75a) and the "$t_d$" voltage, supplied by way of lead 75b. The $t_s$ voltage represents the time allotment set up in the schedule unit as the maximum time interval ("time-to-go") allotted to the apprehended craft for arrival at the "entry point" and commencement of the final descent and landing operation. This $t_s$ voltage, therefore, will be a constantly decreasing voltage, running down from its initial value to a final value of zero as the time runs out. The voltage $t_d$ represents the time required for the apprehended craft to arrive at the entry point, on the basis of the $r$ and $\theta$ information repetitiously fed into the Datac, over lines 242 and 245, from Antrac memory units 56 and 57, as heretofore described.

The $t_s/t_d$ potentiometer 76 (FIGS. 2 and 9) actuated by servo 75, continuously delivers its voltage signal back to schedule unit 77, by way of line 76a, where it is continuously checked to determine whether the $t_s/t_d$ value represented by said voltage signal is at least equal to unity. If it should fall below unity—thereby signifying that the pilot of the craft whose course is being tracked has allowed his craft to fall behind schedule—a new $t_s$ time value will be selected, and the $t_s$ voltage signal fed into servo 75, by way of lead 75a, will be altered correspondingly. The new $t_s$ time value, of course, will be one that has not previously been assigned to any other craft.

To accomplish the $t_s$ value selection just referred to, the schedule unit 77 is provided with fourteen time selector units, a timer unit, an altitude circuit, and a set of six entry-gate generators. FIGS. 10, 13, 14, 16 and 18 show some of the representative time selector units and relay circuits in the schedule unit, and FIG. 17 shows two of the entry-gate generator sets.

Each time selector unit operates, after the "Datac" is started, to sample the voltage levels representing time intervals on the $t_s$ potentiometer which is on the timer unit; and upon receiving a signal from the "Datac" unit that the ratio of $t_s/t_d=1$ has been reached, it reserves that time interval and the next succeeding interval until the scheduled aircraft has reached the entry gate.

Figure 13:
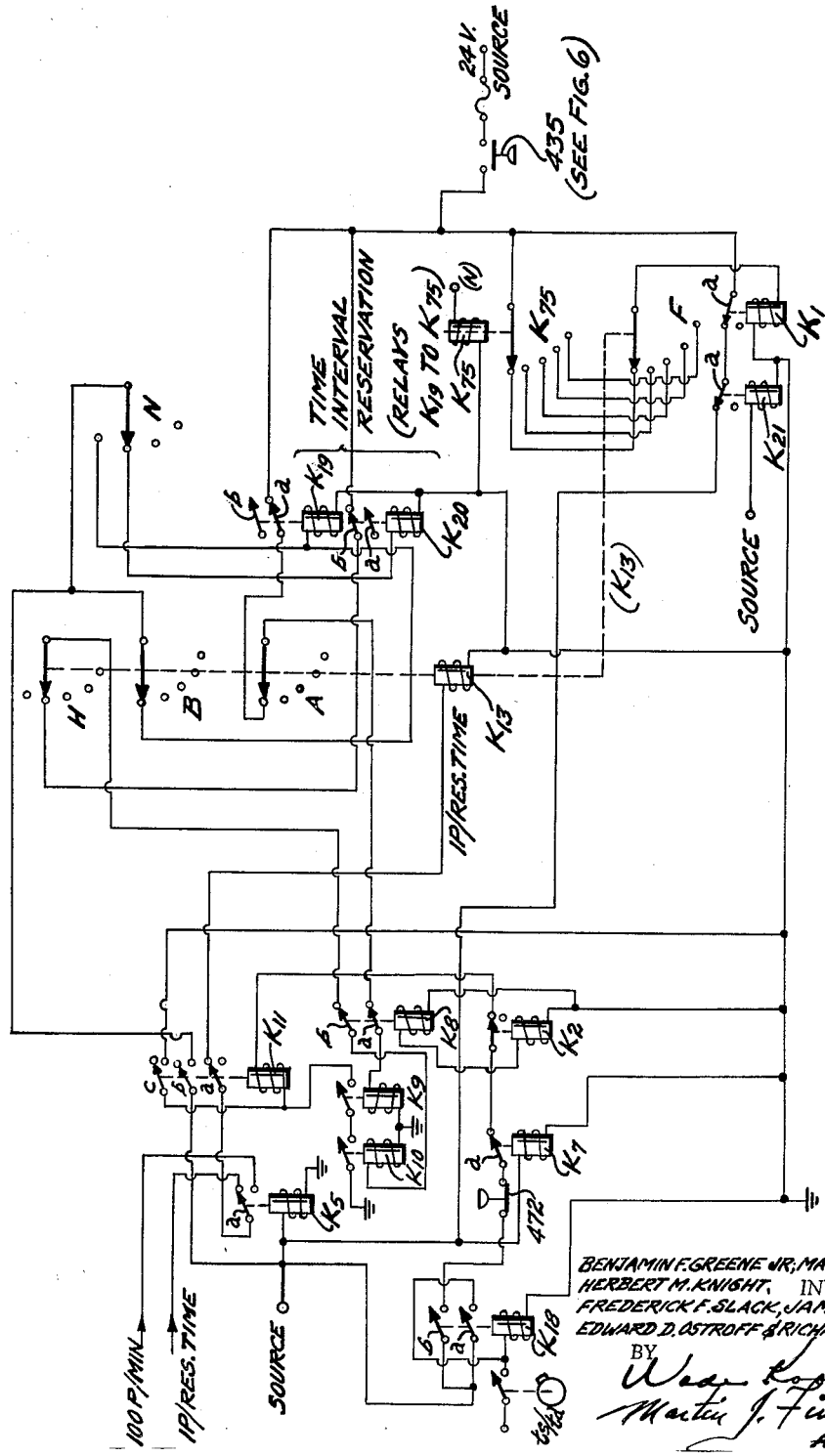

FIG. 13 shows the circuit for the operation under normal operation. Operating current is supplied by the start relay K–4 and operates the pulse control relay K–5 and the ratio relay K–18. The ratio relay K–18 closes when $t_s/t_d=1.0$ and holds until the end of run. The reservation check relays K–9 and K–10 and the time interval reservation relays, one for each time interval, reserve the time interval. The reservation hold relay K–11 closes when $t_s/t_d=1.0$, and if the time interval is unoccupied, contacts on K–11 shall close to light the "scheduled" lamp, to provide the voltage to close the time interval relays, and contacts shall open to put out the "being scheduled" lamp.

When the step-back button (on the time situation panel) corresponding to the time interval reserved, is pushed, the time selector unit which has reserved that interval shall automatically step back to the next unreserved interval. Circuitwise the push button voltage passes through bank G K–13 which in turn opens K–2, opening K–11, and this allows the 100 pulse/minute line to step K–13 around to a new unreserved time interval (see FIGS. 10 and 13).

If during operations the computer channel reset button is pushed, K–13 shall return to the minimum voltage level represented by the position of K–76. The Normal Schedule Operation Diagram (FIG. 13) shows the connection between K–27, bank B and K–13, bank F. If K–13, bank F, is not in the same relative position as K–76, bank B, K–1 shall be de-energized. If the computer channel is in the non-operating condition, a voltage path shall be provided by the contacts of K–1 and K–21 to close K–5 allowing 100 pulses/minute to pass to K–13 stepping it around until the proper level has been reached.

Figure 10:
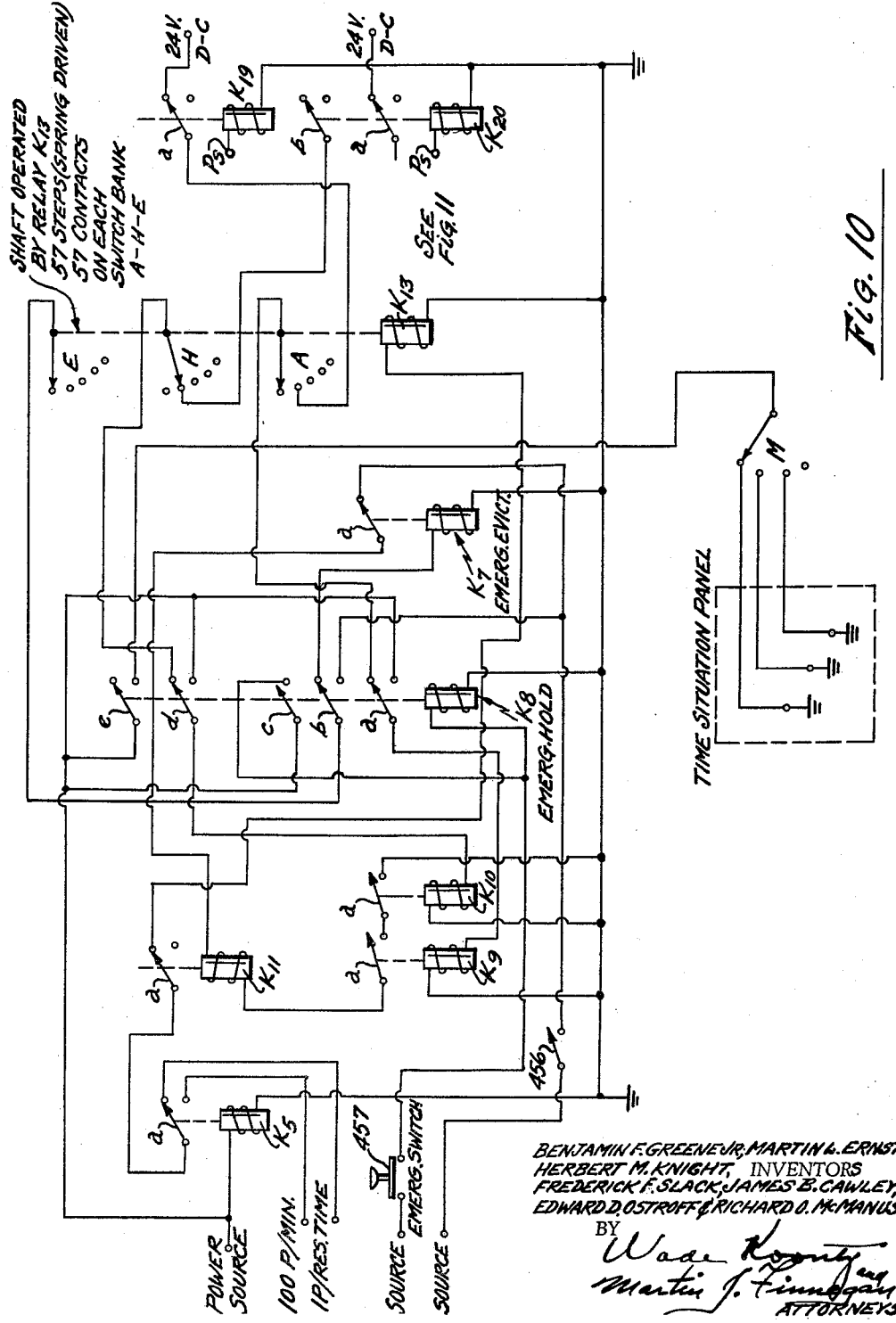
Figure 11:
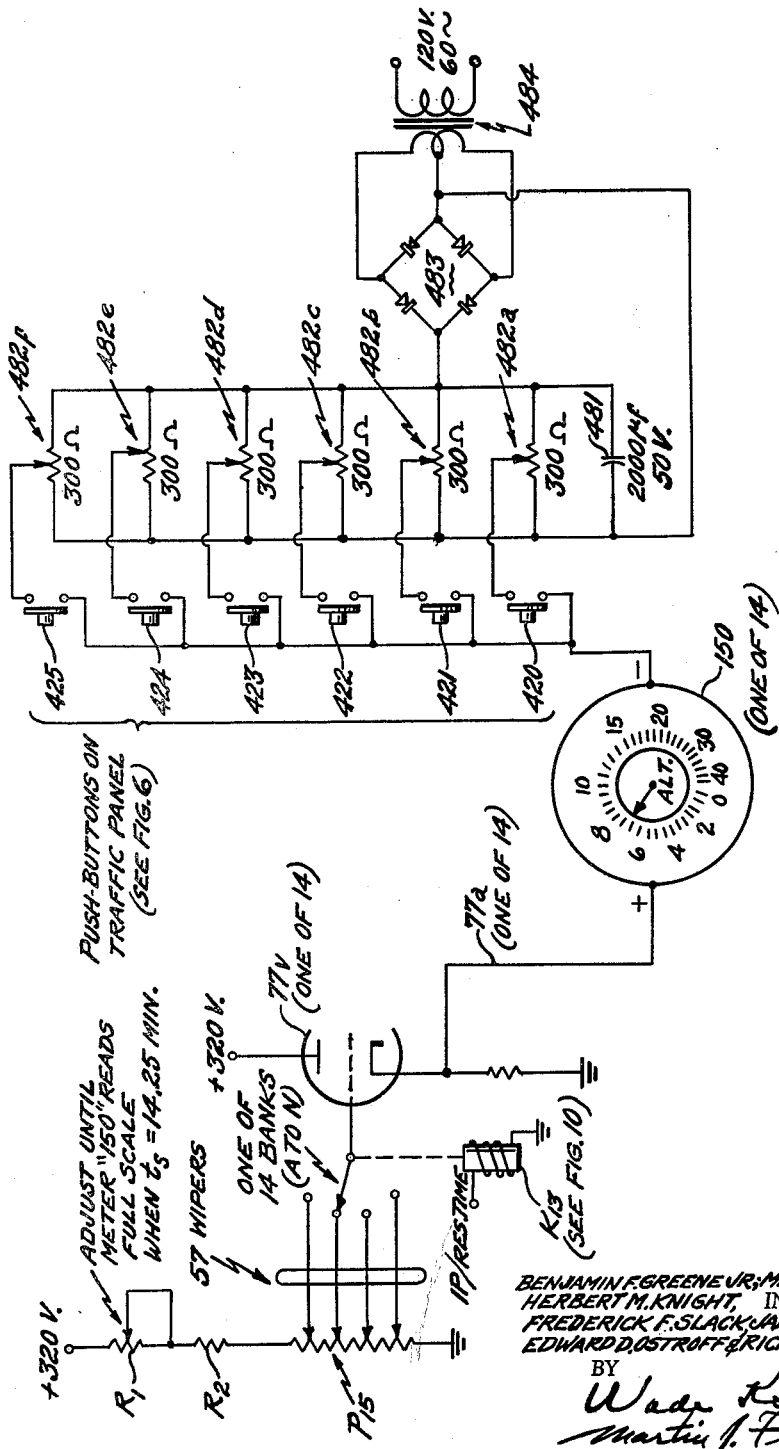
Figure 12:
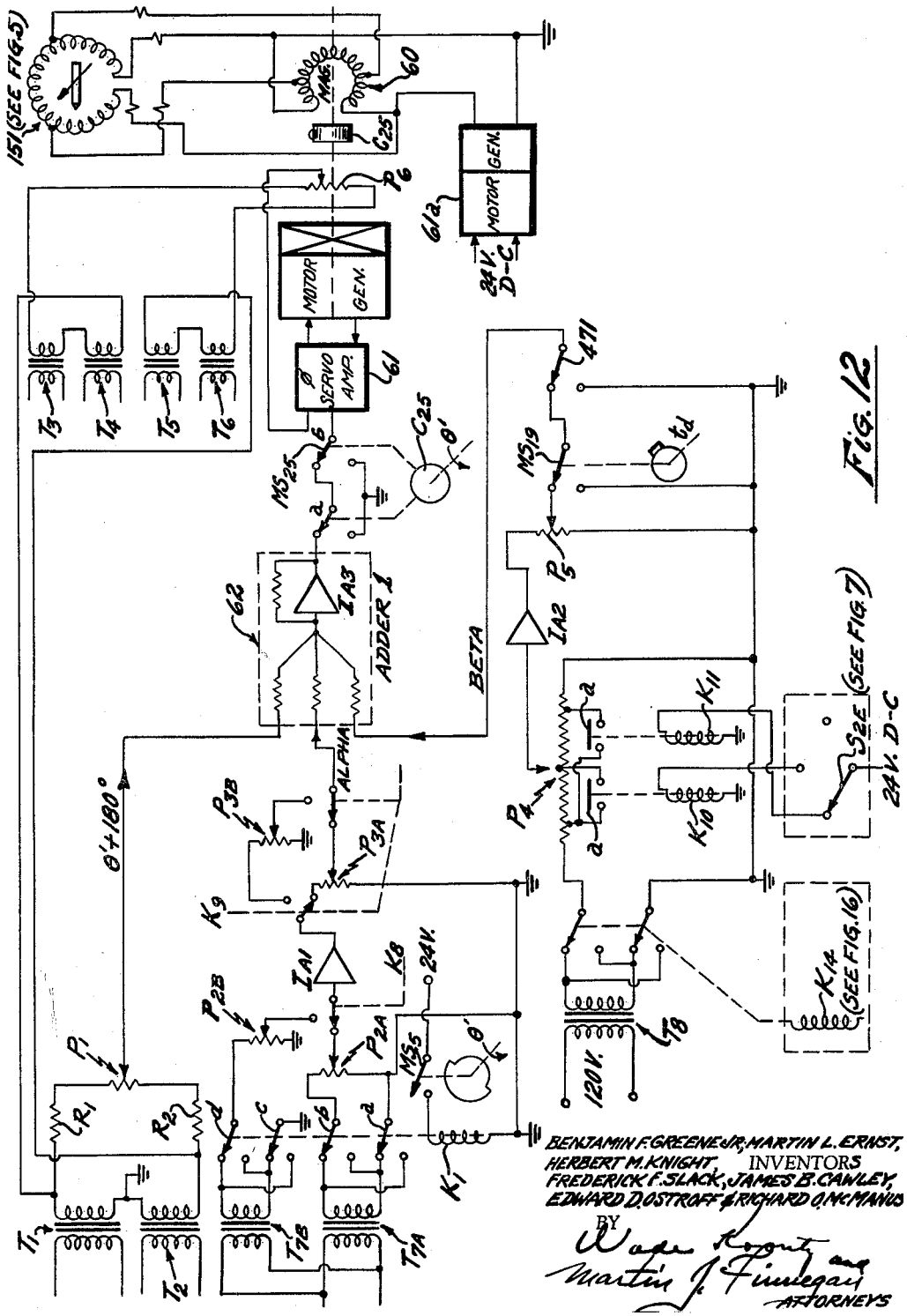

When the aircraft is falling behind schedule and the ratio $t_s/t_d=0.95$, a signal voltage from the flight plan unit shall pass through bank L K–13 and then to the time situation panel on which a light will indicate what time interval the aircraft is occupying. FIGS. 10, 11 and 13 show this circuit.

Not only shall the time selector unit reserve the interval scheduled in, but also the next succeeding interval. Banks A, B, H and N shall reserve these times by closing the time interval reserve relays.

When the reserve time switch is closed on the time situation panel, the time interval reserve relay corresponding to that interval shall close and reserve that time. The relay and switch are shown on FIG. 13.

The time selector unit shall provide to the time situation panel an indication of the interval in which the aircraft is scheduled and whether it is a jet, bomber, or cargo type aircraft. Banks I, J and K of K–13 (FIGS. 10, 11 and 13) are used for this purpose.

When an emergency aircraft is scheduled, the time selector unit shall supply to the time situation panel an indication of the interval that has been reserved for the emergency aircraft. Bank M, K–13 (FIG. 10) supplies this information.

Common to all time situation units shall be one 57-step spring-driven stepping switch which shall indicate the position of the minimum time interval. Bank C of this switch shall supply a voltage to an indicator lamp on the time situation panel.

The computer shall be capable of being manually started and automatically or manually reset. There shall be two start push buttons, wired in parallel, one at the time selector unit position and one at the traffic panel. The push buttons shall control a relay K–4 which will hold closed after one pulse from the push button (FIG. 18). The manual reset shall be push buttons, one at the time situation unit and the other at the traffic panel, which will open the hold circuit on the start relay K–4. When the aircraft reaches the entry gate, the range $r'$ will equal zero, and the start circuit shall be automatically reset. If the computer is scheduled when $t_d=1.5$ min. and the ratio $t_s/t_d=0.95$, the computer shall be automatically reset.

When it is necessary for an aircraft to take the shortest possible flight path to the entry gate due to an emergency, the time selector unit shall be able to automatically evict the aircraft occupying the time interval and automatically assign it to the emergency aircraft. The evicted aircraft shall be automatically assigned to the next available time interval. FIG. 10 shows the relays used in this circuit. When the emergency hold relay K–8 is closed, the reservation check relays are closed and a signal is supplied to bank E of the stepping switch. The signal then passes to any other time selector unit whose stepping switch is in the same position and its emergency evict relay K–7 closes, causing that time selector unit to search for a new interval.

Figure 14:
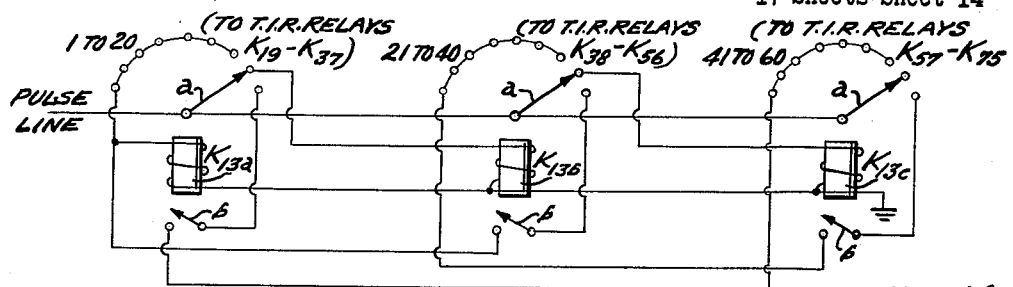
Figure 15:
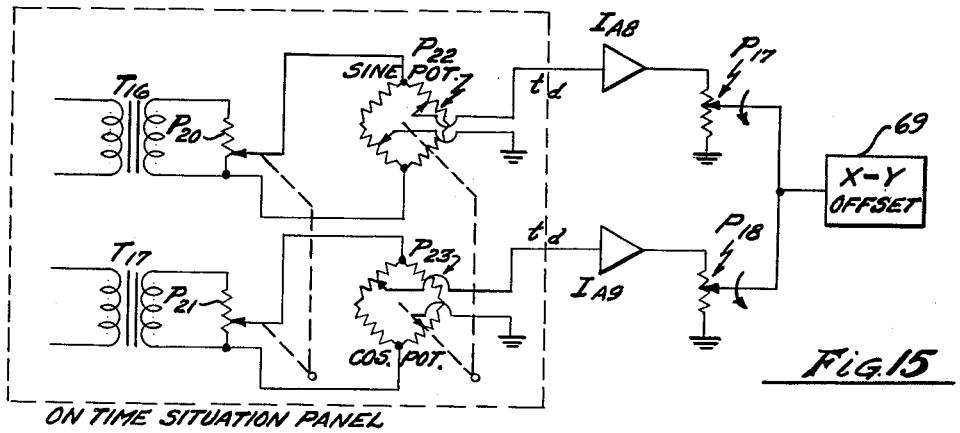
Figure 16:
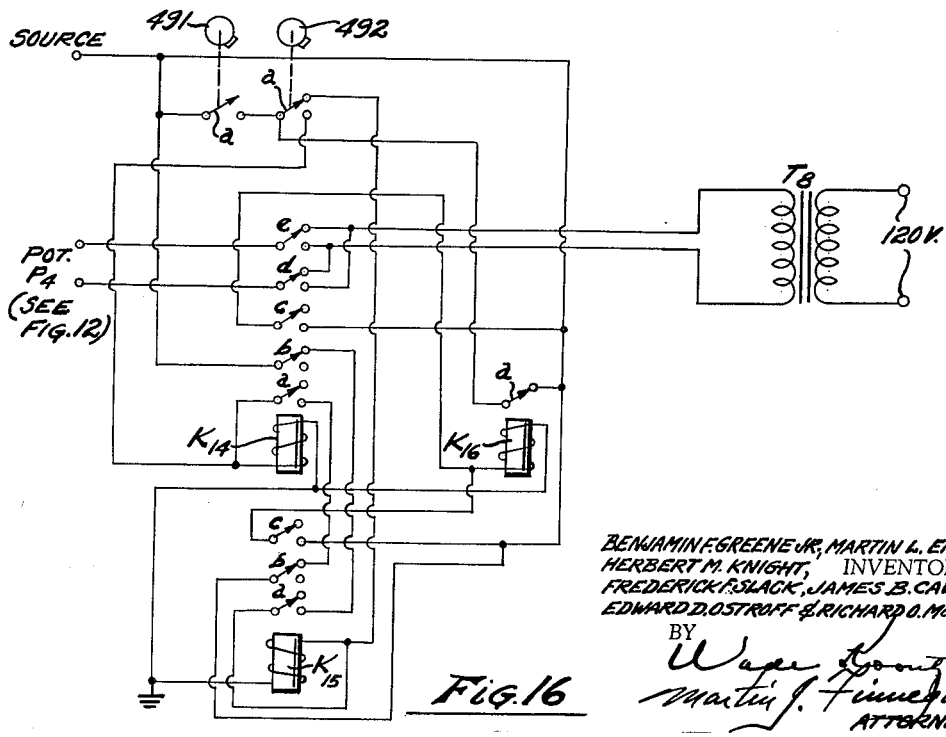

In lieu of a single 57-position spring-driven stepping switch, three 20-position switches may be used, and wired as shown in FIG. 14.

Swith bank C (FIG. 11) functions to select the $t_s$ voltage level from the $t_s$ potentiometer P–14, and switch bank D (FIG. 11) functions to pick off the $a_s$ voltage levels from the $a_s$ potentiometer P–15. These potentiometers P–14 and P–15 are driven by a timer unit consisting of a synchronous motor and gear train, which also drive the two cam and microswitch assemblies. The timer unit is designed for continuous operation at constant speed. One cam-microswitch assembly functions to produce a one-second duration 24-volt D.C. pulse every 15 seconds. (15 seconds is one time interval, $t_{s_n}$.) The other cam-microswitch assembly functions to produce 100 pulses per minute (24 v. D.C.). The pulse duration is chosen to be of sufficient length to facilitate proper actuation of the stepping switches on the time selector units, in response to the successive energizations of the relays controlling such stepping sequences.

The $t_s$ and $a_s$ potentiometers (P–14 and P–15) are preferably driven at a speed of 1 revolution every 14.25 seconds. The potentiometer wipers are equally spaced so that the interval between successive wipers accurately represents $\frac{1}{57}$ of 14.25 minutes, or 15 seconds. P–14 and P–15 are ganged, their windings accurately phased, and their wipers accurately phased so that $a_s$ wiper 1 is in the same angular position as $t_s$ wiper 1, and so on through $a_s$ wiper 57 and $t_s$ wiper 57. The $a_s$—$t_s$ gang is securely mounted to the timer gear train, but provision may be made for angular repositioning of the potentiometer gang. The cycle of timer rotation is as indicated on the diagram designated FIG. 19.

Altitude instructions for the fourteen computer channels are generated by the altitude circuit (FIG. 11). Note that portions of this circuit are in quantities of fourteen; other parts of the circuit are common to the fourteen channels.

When a computer channel is scheduled, K–13 shall select an altitude ($a_s$) interval from P–15 that corresponds to the $t_s$ interval selected. As $t_{s_n}$ decreases, the voltage of $a_{s_n}$ shall decrease linearly and when $t_{s_n}=0$, $a_{s_n}$ voltage shall equal zero.

Figure 5:
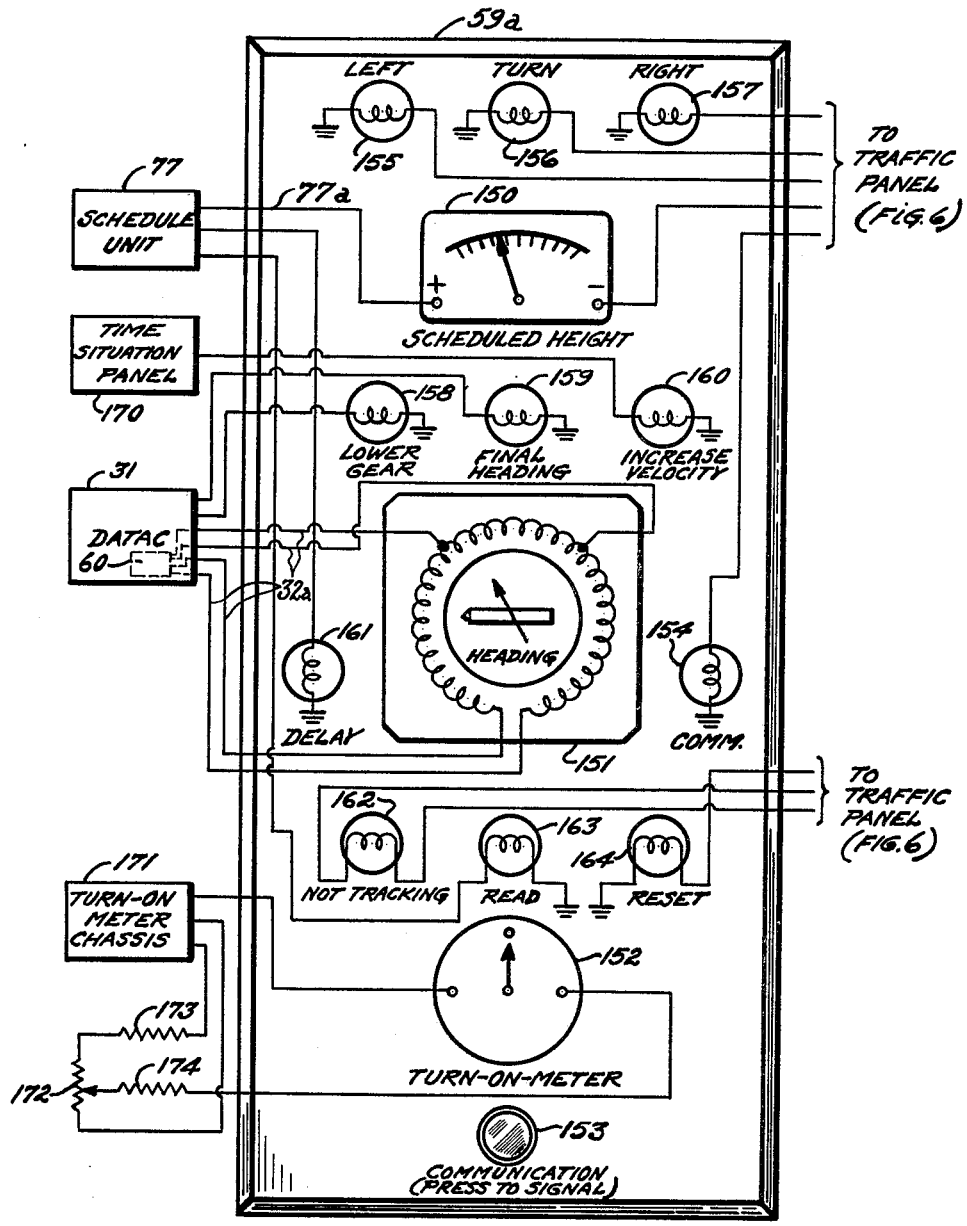
FIGS. 5 and 6 are schematic representations of electrical and physical details of the "relay" and "traffic" panels constituting components of the complete system of FIG. 1.
Figure 6:
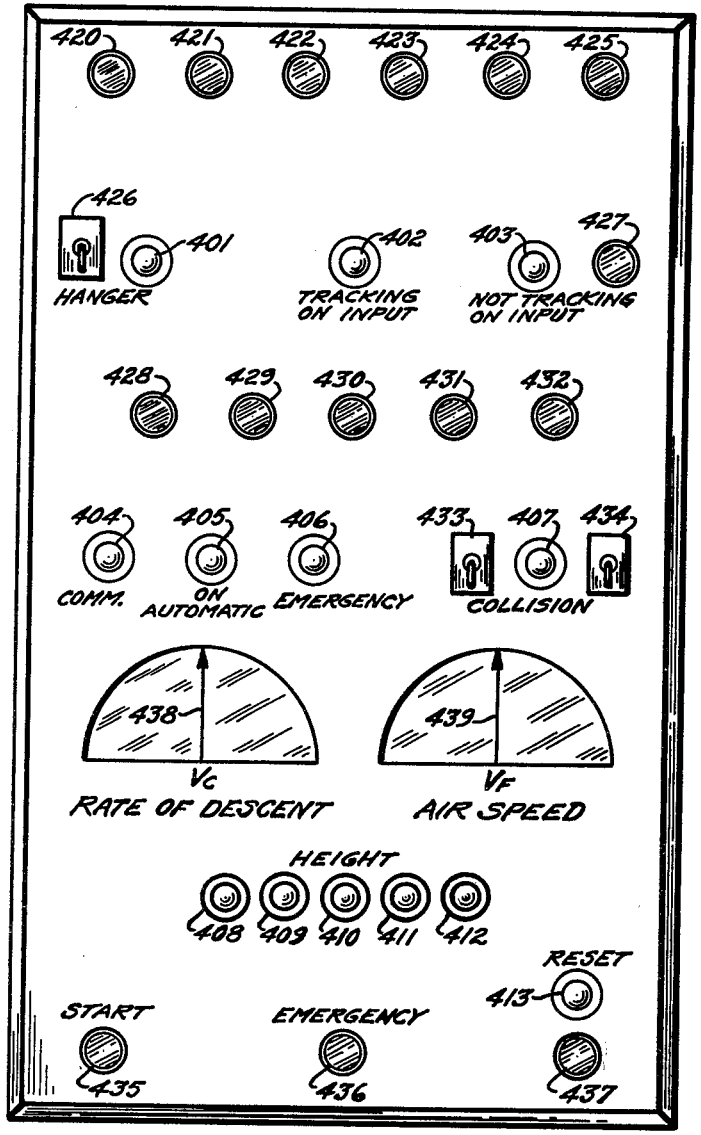

Switch S–2B on the traffic panel (FIG. 7) shall select the rate of descent for display on the relay panel altitude meter 150 (FIG. 5). This switch S–2B shall be ganged with switch S–2A (FIG. 7) so that airspeed and rate of descent can be selected by one knob on the traffic panel (FIG. 6).

At $a_{s_n}=0$, the altitude meter shall read the altitude of the entry point, and provision shall be made for selecting and setting in a voltage corresponding to the entry point altitude. This function shall be performed by switch S–2D (FIG. 7) and its entry point altitude circuit (FIG. 11). The voltage spread and grounding of this circuit depend on the meter sensitivity and the range of entry point altitudes.

The altitude meter 150 should have a non-linear scale reading preferably from 0 to 40,000 feet; the first half of the scale reading 0–10,000 feet and the other half 10,000 to 40,000 feet.

However, since the altitude voltage (or meter current) varies linearly with altitude, the altitude meter movement will have to be non-linear in order to achieve the non-linear scale. The values of the resistors 482 used in the altitude circuit (FIG. 11) are chosen to secure correct meter reading. The D.C. voltage supplying potentiometer P–15 should be dropped through series resistors to a level that gives proper reading on the altitude meter.

The entry gate generator (FIG. 17) is designed to be capable of setting x—y voltages for six different turn-on points. The fourteen computer channels shall be capable of being switched to any of the six turn-on points through means of fourteen rotary switches ($S_{14A}$ and $S_{14B}$) located on the time situation panel. FIG. 17 shows the circuits for two turn-on points and two rotary switches. The remaining turn-on point circuits and rotary switches are wired in the same manner.

There has now been described an automatic-tracking and computation method and system for the control of traffic approaching an airport or landing area. The described method and system provide automatic tracking of signals from search radar, IFF, radio beacon or equivalent signalling means. This invention also provides automatic computation of possible arrival time, automatic assignment of scheduled arrival, taking into consideration all other traffic, and automatic computation of suitable detours to maintain the schedule. Initial identification and acquisition of target is accomplished manually, and manual override is provided for emergency. A brief recapitulation of the mode of operation of the system may be helpful: Information from radar, IFF, or beacon is displayed on three P.P.I. consoles, two in front of the two traffic operators, and the other in front of the monitor operator. A traffic operator, after identifying the plane and determining its type, altitude, and airspeed, assigns a tracking gate to the aircraft by means of the Light Gun and Acquisition Unit. By pushing a button, the computer ("Datac") is started and, using the position information fed automatically from the tracking unit ("Antrac") to the computer, the aircraft is scheduled and vectored to the top of the glide path. The scheduling is done automatically and takes into account the plane's position, airspeed and other traffic. The computer output is fed to relay panels where a relayman simply reads heading and altitude to the aircraft over conventional radio communication facilities, under the control of relay panel switches duplicative of that indicated at 153 in FIG. 5. The monitor operator can reserve time for take-offs in the future, can reschedule manually for emergencies, and in general checks to see that aircraft are meeting their schedules.

What we claim is:

1. Apparatus for simultaneously directing a plurality of aircraft toward a common point of entry to a landing area, comprising means at a control station for observing the range, azimuth, heading and air speed of each craft by successive tracking operations initiated in each instance by apprehension of signals representing radar pulse echoes reflected from said craft, computer means having input circuits utilizing the pulse echo signals apprehended by said observing means for selecting for the first apprehended craft an approach path "A" terminating at said entry point, which path "A" can be flown by said craft, at its observed air speed and under the prevailing wind and altitude conditions, within an allotted approach-time period of "$n$" units of time, means for selecting for the next apprehended craft an approach path "B" terminating at said entry point, which path "B" can be flown by said second craft, at its observed air speed and under the prevailing wind and altitude conditions, within an allotted approach-time period of "$n$" plus "$c$" time units, wherein "$c$" has a value equal to an integral multiple of the time interval "1" pre-selected as the length of time that should elapse between entry point arrivals of two consecutively approaching craft, said observing means including photo-electrically responsive means for converting radar scope illumination signals into range and azimuth voltage signals, and means including range and azimuth memory circuits for continuously tracking the craft identified by said illumination signals.

2. Apparatus as defined in claim 1, including range and azimuth saw-tooth pulse generating means interlocked with said photo-electrically responsive means, said pulse generating means being triggered by radar signals transmitted from said control station.

3. Apparatus as defined in claim 1, including means interlocked with said tracking means to control the video content of the radar echo energy reflected back to said control station.

4. Apparatus as defined in claim 1, wherein said selecting means includes $t_s/t_d$ ratio computing means, with the symbol "$t_s$" representing a period of time that has been pre-selected as adequate for traverse of the approach zone by any apprehended craft, and with the symbol "$t_d$" representing a computed flying time period based upon the observed position, air speed, heading, and altitude of the apprehended craft, in conjunction with prevailing wind conditions.

5. Apparatus as defined in claim 4, including potentiometer means for progressively reducing a voltage signal from a maximum value to zero as the pre-selected "$t_s$" time period is counted down, and constant speed dynamoelectric means for driving said potentiometer means.

6. Apparatus as defined in claim 4, including potentiometer means for varying the voltage level of a signal representative of the "$t_d$" component of a said "$t_s/t_d$" ratio, and servo means responsive to the observed position, air speed, heading, and altitude of the apprehended craft, for controlling the operation of said potentiometer means.

7. Apparatus as defined in claim 4, including spring-actuated stepping switches controlling allocation of available flight paths "A," "B," et seq., to apprehend craft in accordance with $t_s/t_d$ ratio values computed by said ratio computing means, and means including clock-pulsed relay circuits controlling the movement of said spring-actuated stepping switches.

References Cited in the file of this patent

UNITED STATES PATENTS

| | | |
|---|---|---|
| 2,459,482 | Bond | Jan. 18, 1949 |
| 2,475,221 | Coley | July 5, 1949 |
| 2,585,855 | Sherwin | Feb. 12, 1952 |
| 2,825,054 | Ernst | Feb. 25, 1958 |
| 2,844,817 | Green | July 22, 1958 |
| 2,878,469 | Casabona | Mar. 17, 1959 |
| 2,891,244 | Pastoriza | June 16, 1959 |
| 2,927,751 | Daspit | Mar. 8, 1960 |